US012782609B2

(12) United States Patent
Topliss et al.

(10) Patent No.: US 12,782,609 B2
(45) Date of Patent: Nov. 3, 2026

(54) TUNABLE LENS CONTROLLED BY AN ACTUATOR

(71) Applicant: Apple Inc., Cupertino, CA (US)

(72) Inventors: Richard J Topliss, Cambridge (GB); Thomas M Gregory, Cambridgeshire (GB); Gregory L Tice, Cupertino, CA (US); Patrick R Gill, Victoria (CA); James E Pedder, Oxfordshire (GB)

( * ) Notice: Subject to any disclaimer, the term of this patent is extended or adjusted under 35 U.S.C. 154(b) by 236 days.

(21) Appl. No.: 18/660,072

(22) Filed: May 9, 2024

(65) Prior Publication Data

US 2024/0288612 A1 Aug. 29, 2024

Related U.S. Application Data

(63) Continuation of application No. PCT/US2022/049093, filed on Nov. 7, 2022.

(Continued)

(51) Int. Cl.
*G02B 3/12* (2006.01)
*G02B 27/01* (2006.01)

(52) U.S. Cl.
CPC .......... *G02B 3/12* (2013.01); *G02B 27/0172* (2013.01); *G02B 27/0176* (2013.01); *G02B 2027/0154* (2013.01)

(58) Field of Classification Search
CPC .. G02B 3/12; G02B 27/0172; G02B 27/0176; G02B 2027/0154

(Continued)

(56) References Cited

U.S. PATENT DOCUMENTS

| | | | |
|---|---|---|---|
| 5,731,909 | A | 3/1998 | Schachar |
| 6,411,448 | B2 | 6/2002 | Takanashi et al. |

(Continued)

FOREIGN PATENT DOCUMENTS

| | | | |
|---|---|---|---|
| EP | 1174748 A2 | 1/2002 | |
| GB | 1293965 A | 10/1972 | |

(Continued)

OTHER PUBLICATIONS

Hyung-Min Son et al., "New Variable Focal Liquid Lens System Using Antagonistic-type SMA Actuator," 4th International Conference on Autonomous Robots and Agents, Feb. 10-12, 2009, pp. 476-479, IEEE, United States.

*Primary Examiner* — Sharrief I Broome
(74) *Attorney, Agent, or Firm* — Treyz Law Group, P.C.; Joseph F. Guihan; Jinie M. Guihan

(57) ABSTRACT

A head-mounted device may have a display that displays content for a user. Head-mounted support structures in the device support the display on the head of the user. A lens module in the head-mounted device may include a transparent lens element, a positioner that extends around the periphery of the transparent lens element, and an actuator that selectively shifts the positioner in a first direction. Shifting the positioner in the first direction causes the transparent lens element to be biased in a second direction that is orthogonal to the first direction at multiple points around the periphery of the transparent lens elements. The positioner may be attached to guide structures that each have a respective angled slot. Each angled slot may receive a respective tab of the transparent lens element or a respective tab of a lens shaping element that is attached to the transparent lens element.

21 Claims, 10 Drawing Sheets

Related U.S. Application Data

(60) Provisional application No. 63/280,044, filed on Nov. 16, 2021.

(58) Field of Classification Search
USPC .......................................................... 359/665
See application file for complete search history.

(56) References Cited

U.S. PATENT DOCUMENTS

| | | | | |
|---|---|---|---|---|
| 7,423,822 | B2 | 9/2008 | Miyauchi et al. | |
| 7,646,544 | B2 | 1/2010 | Batchko et al. | |
| 8,755,124 | B2 | 6/2014 | Aschwanden et al. | |
| 9,739,911 | B2 | 8/2017 | Feng et al. | |
| 2001/0033437 | A1 | 10/2001 | Meehan et al. | |
| 2007/0211349 | A1 | 9/2007 | Chen | |
| 2008/0144185 | A1* | 6/2008 | Wang | G02B 3/14 235/472.01 |
| 2009/0052049 | A1 | 2/2009 | Batchko et al. | |
| 2010/0182703 | A1 | 7/2010 | Bolis | |
| 2012/0092775 | A1* | 4/2012 | Duston | G02B 26/004 359/666 |
| 2014/0285911 | A1 | 9/2014 | Aschwanden et al. | |
| 2015/0378067 | A1 | 12/2015 | Stevens et al. | |
| 2016/0124220 | A1 | 5/2016 | Bueeler et al. | |
| 2018/0039052 | A1* | 2/2018 | Khan | G02B 17/0856 |
| 2019/0104239 | A1 | 4/2019 | Aschwanden et al. | |
| 2019/0302479 | A1* | 10/2019 | Smyth | G02B 26/004 |
| 2020/0089024 | A1 | 3/2020 | Stevens et al. | |
| 2020/0096770 | A1* | 3/2020 | Pedder | G02B 27/0172 |
| 2021/0141212 | A1 | 5/2021 | Jacoby et al. | |
| 2023/0358924 | A1* | 11/2023 | Aschwanden | F03G 7/0614 |

FOREIGN PATENT DOCUMENTS

| | | | | |
|---|---|---|---|---|
| GB | 2353606 | A | 2/2001 | |
| JP | 2010513952 | A | 4/2010 | |
| TW | 200403472 | A | 3/2004 | |
| TW | 200734711 | A | 9/2007 | |
| WO | 2015063233 | A2 | 5/2015 | |
| WO | WO-2019186183 | A1 * | 10/2019 | G02B 3/14 |

* cited by examiner

TUNABLE LENS CONTROLLED BY AN ACTUATOR

This application is a continuation of international patent application No. PCT/US2022/049093, filed Nov. 7, 2022, which claims priority to U.S. provisional patent application No. 63/280,044, filed Nov. 16, 2021, which are hereby incorporated by reference herein in their entireties.

BACKGROUND

This relates generally to electronic devices and, more particularly, to wearable electronic device systems.

Electronic devices are sometimes configured to be worn by users. For example, head-mounted devices are provided with head-mounted structures that allow the devices to be worn on users' heads. The head-mounted devices may include optical systems with lenses. The lenses allow displays in the devices to present visual content to users.

Head-mounted devices typically include lenses with fixed shapes and properties. If care is not taken, it may be difficult to adjust these types of lenses to optimally present content to each user of the head-mounted device.

SUMMARY

A head-mounted device may have a display that displays content for a user. Head-mounted support structures in the device support the display on the head of the user. A head-mounted device may also not include a display or may include a projection type display and may include a lens module that allows a viewer to see the real world.

A lens module in the head-mounted device may include a transparent lens element, a positioner that extends around the periphery of the transparent lens element, and an actuator that selectively shifts the positioner in a first direction. Shifting the positioner in the first direction causes the transparent lens element to be biased in a second direction that is orthogonal to the first direction at multiple points around the periphery of the transparent lens elements.

The positioner may be attached to guide structures that each have a respective angled slot. Each angled slot may receive a respective tab of the transparent lens element or a respective tab of a lens shaping element that is attached to the transparent lens element. The tabs may also be aligned with grooves in a lens housing that extends around a periphery of the transparent lens element. The actuator may rotate the positioner and attached guide structures relative to the transparent lens element. This causes the tabs to move within the angled slots, which causes displacement of the tabs within their grooves.

The slots may have different angles relative to the grooves to allow different tabs to be displaced by different amounts with a single actuator.

The lens module may also include a second transparent lens element. Fluid may be incorporated between the first and second transparent lens elements to define a fluid-filled chamber between the first and second transparent lens elements.

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain a display formed from one or more display panels (displays) for displaying visual content to a user. A lens system may be used to allow the user to focus on the display and view the visual content. The lens system may have a left lens module that is aligned with a user's left eye and a right lens module that is aligned with a user's right eye.

In some cases, the user may wish to view real-world content rather than a display. The user may require different optical prescriptions depending on the distance to an object, the degree to which the user's eyes are verging (which may be predictable based on the distance to the object viewed), lighting conditions, and/or other factors. The head-mounted device may contain lenses disposed in such a way as the real-world content is viewable through the lens system.

The lens modules in the head-mounted device may include lenses that are adjustable. For example, fluid-filled adjustable lenses may be adjusted for specific viewers.

Figure 1:
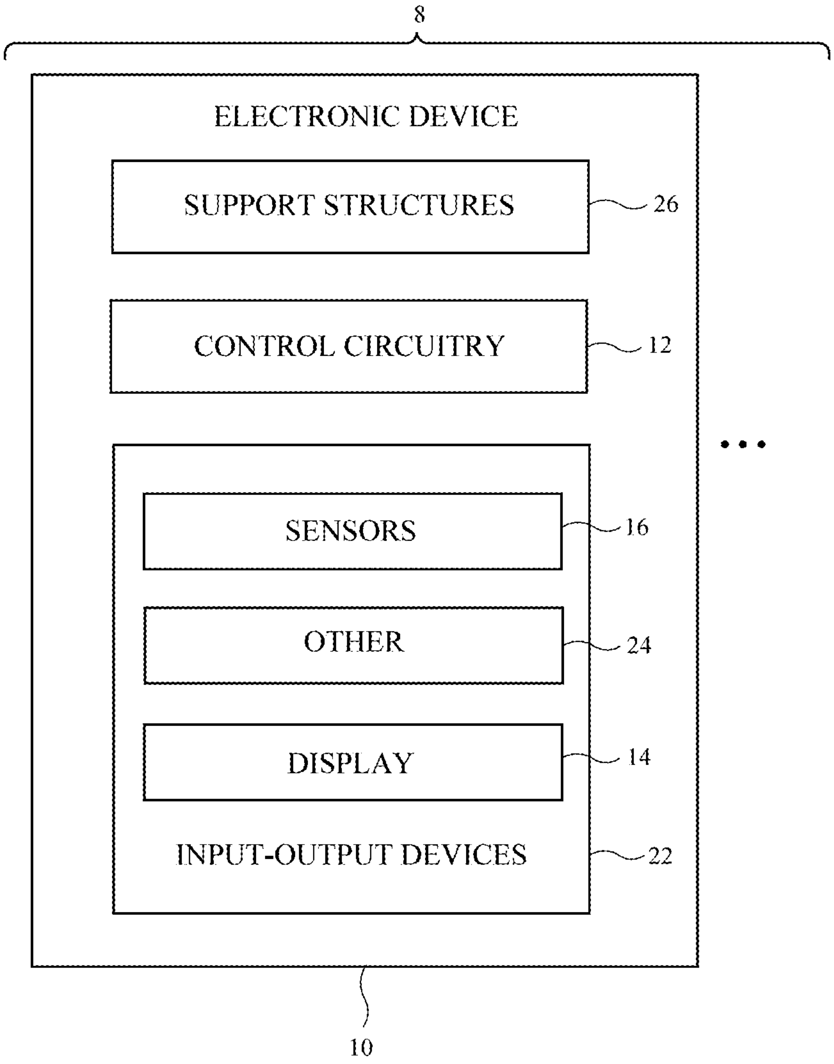
FIG. 1 is a schematic diagram of an illustrative electronic device such as a head-mounted display device in accordance with an embodiment.

A schematic diagram of an illustrative system having an electronic device with a lens module is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involved in processing three-dimensional facial image data, operations involving the adjustment of components using control signals, etc.). Control circuitry 12 may include wired and wireless communications circuitry. For example, control circuitry 12 may include radio-frequency transceiver circuitry such as cellular telephone transceiver circuitry, wireless local area network (WiFi®) transceiver circuitry, millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video and/or audio data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as display 14. In some configurations, display 14 of device 10 includes left and right display panels (sometimes referred to as left and right portions of display 14 and/or left and right displays) that are in alignment with the user's left and right eyes, respectively. In other configurations, display 14 includes a single display panel that extends across both eyes. The example of device 10 including a display is merely illustrative and display(s) 14 may be omitted from device 10 if desired. Device 10 may include an optical pass-through area where real-world content is viewable to the user either directly or through a tunable lens.

Display 14 may be used to display images. The visual content that is displayed on display 14 may be viewed by a user of device 10. Displays in device 10 such as display 14 may be organic light-emitting diode displays or other displays based on arrays of light-emitting diodes, liquid crystal displays, liquid-crystal-on-silicon displays, projectors or displays based on projecting light beams on a surface directly or indirectly through specialized optics (e.g., digital micromirror devices), electrophoretic displays, plasma displays, electrowetting displays, or any other suitable displays.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), fingerprint sensors and other biometric sensors, optical position sensors (optical encoders), and/or other position sensors such as linear position sensors, and/or other sensors. Sensors 16 may include proximity sensors (e.g., capacitive proximity sensors, light-based (optical) proximity sensors, ultrasonic proximity sensors, and/or other proximity sensors). Proximity sensors may, for example, be used to sense relative positions between a user's nose and lens modules in device 10.

User input and other information may be gathered using sensors and other input devices in input-output devices 22. If desired, input-output devices 22 may include other devices 24 such as haptic output devices (e.g., vibrating components), light-emitting diodes and other light sources, speakers such as car speakers for producing audio output, and other electrical components. Device 10 may include circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support display(s) 14, sensors 16, other components 24, other input-output devices 22, and control circuitry 12.

Figure 2:
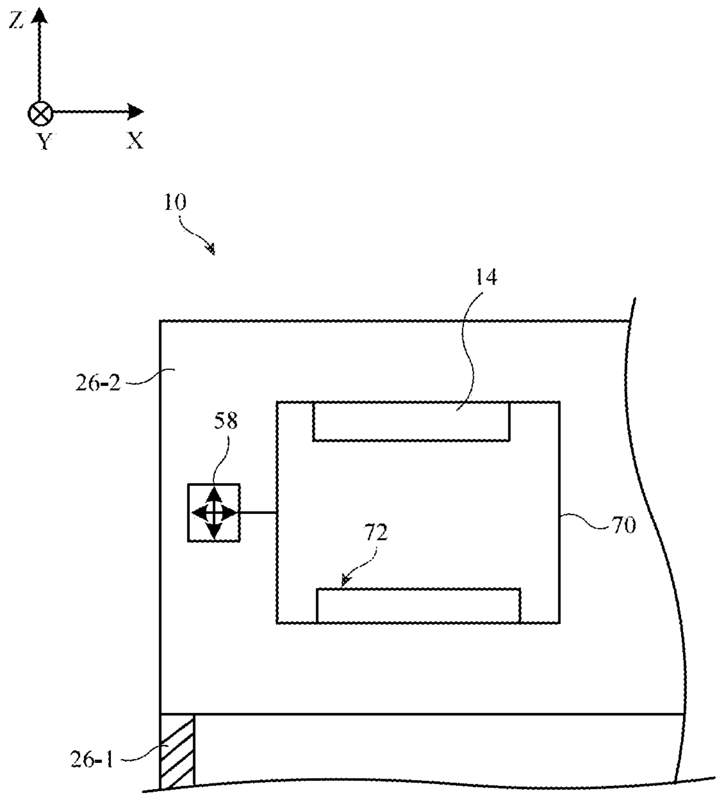
FIG. 2 is a top view of an illustrative head-mounted device in accordance with an embodiment.

FIG. 2 is a top view of electronic device 10 in an illustrative configuration in which electronic device 10 is a head-mounted device. As shown in FIG. 2, electronic device 10 may include support structures (see, e.g., support structures 26 of FIG. 1) that are used in housing the components of device 10 and mounting device 10 onto a user's head. These support structures may include, for example, structures that form housing walls and other structures for main unit 26-2 (e.g., exterior housing walls, lens module structures, etc.) and straps or other supplemental support structures such as structures 26-1 that help to hold main unit 26-2 on a user's face.

Display 14 may include left and right display panels (e.g., left and right pixel arrays, sometimes referred to as left and right displays or left and right display portions) that are mounted respectively in left and right display modules 70 corresponding respectively to a user's left eye and right eye. A display module corresponding the user's left eye is shown in FIG. 2.

Each display module 70 includes a display portion 14 and a corresponding lens module 72 (sometimes referred to as lens stack-up 72, lens 72, or adjustable lens 72). Lens 72 may include one or more lens elements arranged along a common axis. Each lens element may have any desired shape and may be formed from any desired material (e.g., with any desired refractive index). The lens elements may have unique shapes and refractive indices that, in combination, focus light from display 14 in a desired manner. Each lens element of lens module 72 may be formed from any desired material (e.g., glass, a polymer material such as polycarbonate or acrylic, a crystal such as sapphire, etc.).

Modules 70 may optionally be individually positioned relative to the user's eyes and relative to some of the housing wall structures of main unit 26-2 using positioning circuitry such as positioner 58. Positioner 58 may include stepper motors, piezoelectric actuators, motors, linear electromagnetic actuators, and/or other electronic components for adjusting the position of displays 14 and lens modules 72. Positioners 58 may be controlled by control circuitry 12 during operation of device 10. For example, positioners 58 may be used to adjust the spacing between modules 70 (and therefore the lens-to-lens spacing between the left and right lenses of modules 70) to match the interpupillary distance IPD of a user's eyes.

In some cases, the distance between lens module 72 and display 14 is variable. For example, the distance between the lens module and the display any be adjusted to account for the eyesight of a particular user. In another example, the lens module may include an adjustable lens element. The curvature of the adjustable lens element may be adjusted in real time to compensate for a user's eyesight, as one example.

The example in FIG. 2 of the device including display modules is merely illustrative. As previously mentioned, the displays may be omitted from device 10 if desired. In this type of arrangement, the device may still include one or more lens modules 72 (e.g., through which the user views the real world). In this type of arrangement, real-world content may be focused for a user who would otherwise need reading glasses, bifocals, etc.

Figure 3:
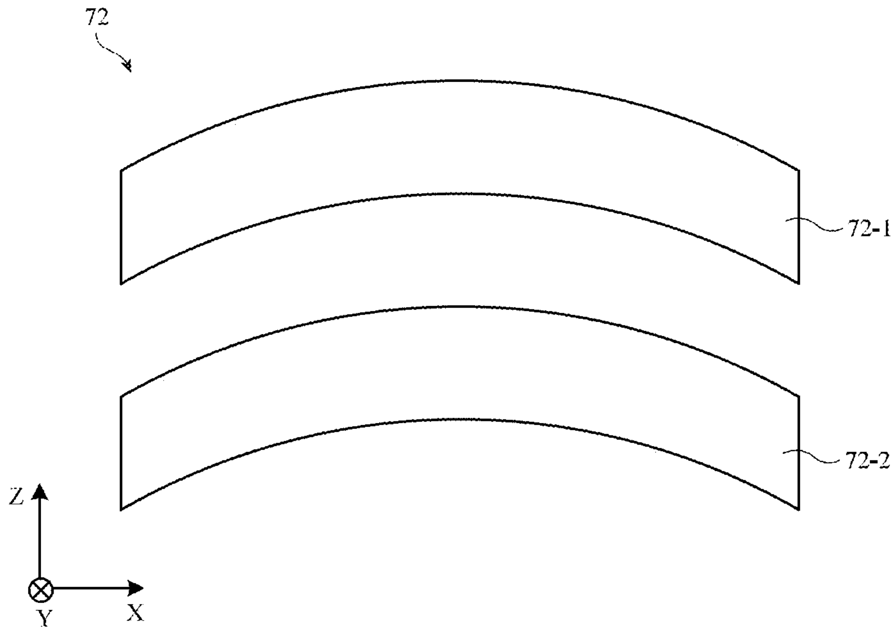
FIG. 3 is a cross-sectional side view of an illustrative lens module with first and second lens elements in accordance with an embodiment.

FIG. 3 is a cross-sectional side view of an illustrative lens module with multiple lens elements. As shown, lens module 72 includes a first lens element 72-1 and a second lens element 72-2. Each surface of the lens elements may have any desired curvature. For example, each surface may be a convex surface (e.g., a spherically convex surface, a cylindrically convex surface, or an aspherically convex surface), a concave surface (e.g., a spherically concave surface, a cylindrically concave surface, or an aspherically concave surface), or a freeform surface. A spherically curved surface (e.g., a spherically convex or spherically concave surface) may have a constant radius of curvature across the surface. In contrast, an aspherically curved surface (e.g., an aspheric concave surface or an aspheric convex surface) may have a varying radius of curvature across the surface. A cylindrical surface may only be curved about one axis instead of about multiple axes as with the spherical surface. In some cases, one of the lens surfaces may have an aspheric surface that changes from being convex (e.g., at the center) to concave (e.g., at the edges) at different positions on the surface. This type of surface may be referred to as an aspheric surface, a primarily convex (e.g., the majority of the surface is convex and/or the surface is convex at its center) aspheric surface, a freeform surface, and/or a primarily convex (e.g., the majority of the surface is convex and/or the surface is convex at its center) freeform surface. A freeform surface may include both convex and concave portions. Alternatively, a freeform surface may have varying convex curvatures or varying concave curvatures (e.g., different portions with different radii of curvature, portions with curvature in one direction and different portions with curvature in two directions, etc.). Herein, a freeform surface that is primarily convex (e.g., the majority of the surface is convex and/or the surface is convex at its center) may sometimes still be referred to as a convex surface and a freeform surface that is primarily concave (e.g., the majority of the surface is concave and/or the surface is concave at its center) may sometimes still be referred to as a concave surface. In one example, shown in FIG. 3, lens element 72-1 has a convex surface that faces display 14 and an opposing concave surface. Lens element 72-2 has a convex surface that faces lens element 72-1 and an opposing concave surface.

One or both of lens elements 72-1 and 72-2 may be adjustable. In one example, lens element 72-1 is a fixed (e.g., non-adjustable) lens element whereas lens element 72-2 is an adjustable lens element. The adjustable lens element 72-2 may be used to accommodate a user's eyeglass prescription, for example. The shape of lens element 72-2 may be adjusted if a user's eyeglass prescription changes (without needing to replace any of the other components within device 10). As another possible use case, a first user with a first eyeglass prescription (or no eyeglass prescription) may use device 10 with lens element 72-2 having a first shape and a second, different user with a second eyeglass prescription may use device 10 with lens element 72-2 having a second shape that is different than the first shape. Lens element 72-2 may have varying lens power and/or may provide varying amount of astigmatism correction to provide prescription correction for the user.

The example of lens module 72 including two lens elements is merely illustrative. In general, lens module 72 may include any desired number of lens elements (e.g., one, two, three, four, more than four, etc.). Any subset or all of the lens elements may optionally be adjustable. Any of the adjustable lens elements in the lens module may optionally be fluid-filled adjustable lenses. Lens module 72 may also include any desired additional optical layers (e.g., partially reflective mirrors that reflect 50% of incident light, linear polarizers, retarders such as quarter wave plates, reflective polarizers, circular polarizers, reflective circular polarizers, etc.) to manipulate light that passes through lens module.

As previously mentioned, one or more of the adjustable lens elements may be a fluid-filled lens element. An example is described herein where lens element 72-2 from FIG. 3 is a fluid-filled lens element. When lens element 72-2 is a fluid-filled lens element, the lens element may include one or more components that define the surfaces of lens element 72-2. These elements may also be referred to a lens elements. In other words, adjustable lens element 72-2 (sometimes referred to as adjustable lens module 72-2) may be formed by multiple respective lens elements.

Figure 4:
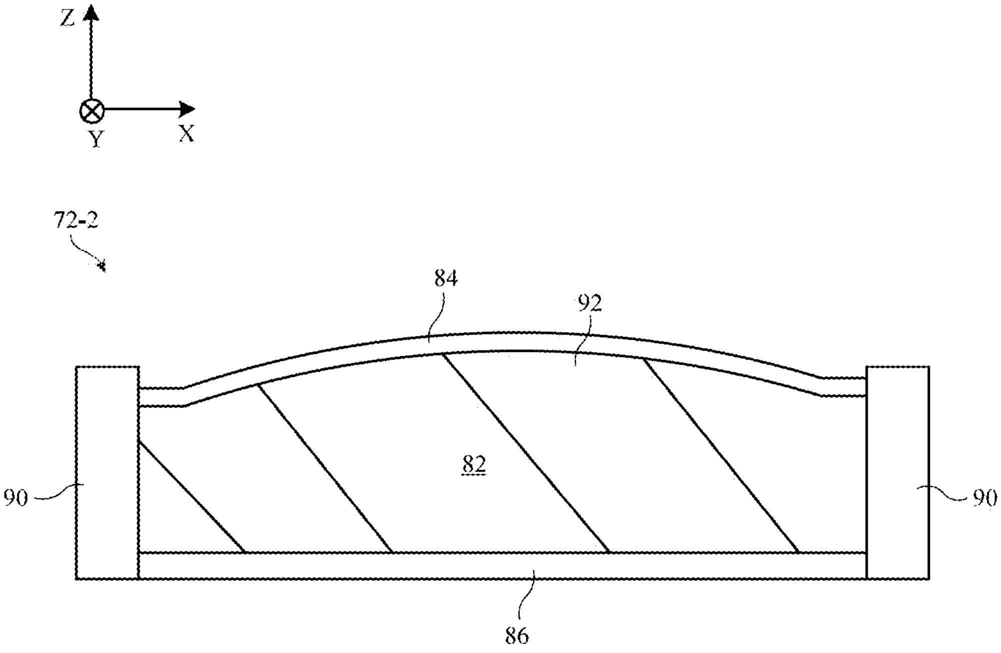
FIGS. 4 and 5 are cross-sectional side views of an illustrative fluid-filled lens element in accordance with an embodiment.

FIG. 4 is a cross-sectional side view of adjustable fluid-filled lens element 72-2. As shown, fluid-filled chamber 82

(sometimes referred to as chamber 82 or fluid chamber 82) that includes fluid 92 is interposed between lens elements 84 and 86. Fluid 92 may be a liquid, gel, or gas with a pre-determined index of refraction (and may therefore sometimes be referred to as liquid 92, gel 92, or gas 92). The fluid may sometimes be referred to as an index-matching oil, an optical oil, an optical fluid, an index-matching material, an index-matching liquid, etc. Lens elements 84 and 86 may have the same index of refraction or may have different indices of refraction. Fluid 92 that fills chamber 82 between lens elements 84 and 86 may have an index of refraction that is the same as the index of refraction of lens element 84 but different from the index of refraction of lens element 86, may have an index of refraction that is the same as the index of refraction of lens element 86 but different from the index of refraction of lens element 84, may have an index of refraction that is the same as the index of refraction of lens element 84 and lens element 86, or may have an index of refraction that is different from the index of refraction of lens element 84 and lens element 86. Lens elements 84 and 86 may have a circular footprint, may have an elliptical footprint, may have or may have a footprint any another desired shape (e.g., an irregular footprint).

The amount of fluid 92 in chamber 82 may have a constant volume or an adjustable volume. If the amount of fluid is adjustable, the lens module may also include a fluid reservoir and a fluid controlling component (e.g., a pump, stepper motor, piezoelectric actuator, motor, linear electromagnetic actuator, and/or other electronic component that applies a force to the fluid in the fluid reservoir) for selectively transferring fluid between the fluid reservoir and the chamber.

Lens elements 84 and 86 may be transparent lens elements formed from any desired material (e.g., glass, a polymer material such as polycarbonate or acrylic, a crystal such as sapphire, etc.). Each one of lens elements 84 and 86 may be elastomeric, semi-rigid, or rigid. Elastomeric lens elements may be formed from a natural or synthetic polymer that has a low Young's modulus for high flexibility. For example the elastomeric membrane may be formed from a material having a Young's modulus of less than 1 GPa, less than 0.5 GPa, less than 0.1 GPa, etc.

Semi-rigid lens elements may be formed from a semi-rigid material that is stiff and solid, but not inflexible. A semi-rigid lens element may, for example, be formed from a thin layer of polymer or glass. Semi-rigid lens elements may be formed from a material having a Young's modulus that is greater than 1 Gpa, greater than 2 GPa, greater than 3 GPa, greater than 10 GPa, greater than 25 GPa, etc. Semi-rigid lens elements may be formed from polycarbonate, polyethylene terephthalate (PET), polymethylmethacrylate (PMMA), acrylic, glass, or any other desired material. The properties of semi-rigid lens elements may result in the lens element becoming rigid along a first axis when the lens element is curved along a second axis perpendicular to the first axis or, more generally, for the product of the curvature along its two principal axes of curvature to remain roughly constant as it flexes. This is in contrast to an elastomeric lens element, which remains flexible along a first axis even when the lens element is curved along a second axis perpendicular to the first axis. The properties of semi-rigid lens elements may allow the semi-rigid lens elements to form a cylindrical lens with tunable lens power and a tunable axis.

Rigid lens elements may be formed from glass, a polymer material such as polycarbonate or acrylic, a crystal such as sapphire, etc. In general, the rigid lens elements may not deform when pressure is applied to the lens elements within the lens module. In other words, the shape and position of the rigid lens elements may be fixed. Each surface of a rigid lens element may be planar, concave (e.g., spherically, aspherically, or cylindrically concave), or convex (e.g., spherically, aspherically, or cylindrically convex). Rigid lens elements may be formed from a material having a Young's modulus that is greater than 25 GPa, greater than 30 GPa, greater than 40 GPa, greater than 50 GPa, etc.

One or more structures such as a lens housing 90 (sometimes referred to as housing 90, lens chassis 90, chassis 90, support structure 90, etc.) may also define the fluid-filled chamber 82 of lens element 72-2.

Figure 5:
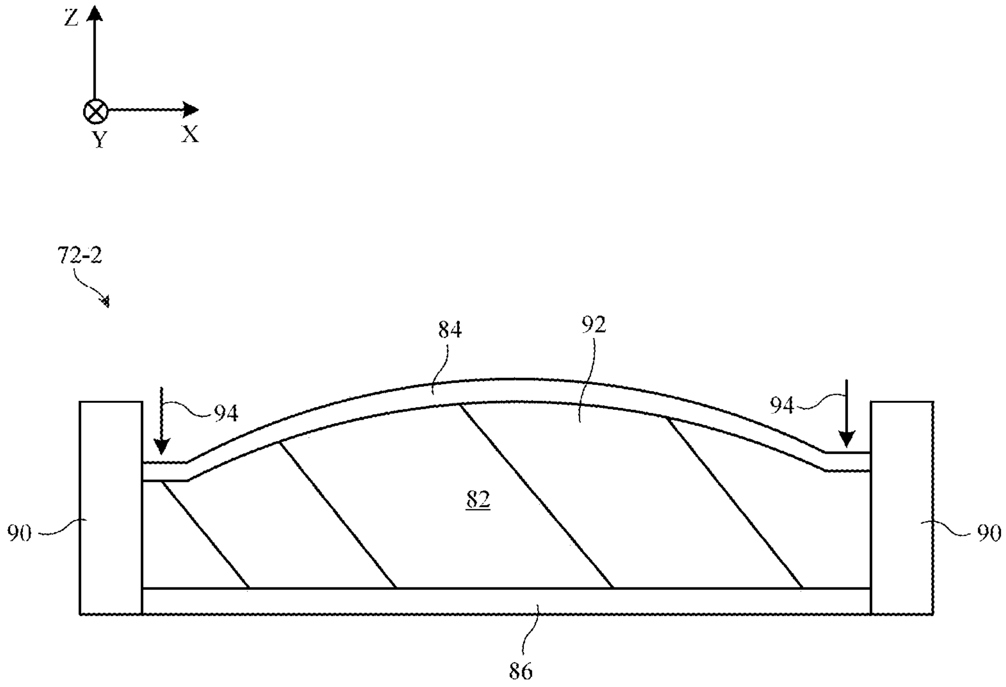

FIG. 5 is a cross-sectional side view of lens element 72-2 showing an illustrative adjustment of the shape of lens element 72-2. As shown, during adjustments of lens element 72-2, lens element 84 may be biased in direction 94 at multiple points along its periphery (e.g., a point force is applied in direction 94 at multiple points). In this way, the curvature of the lens element 84 (and accordingly, the lens power of lens element 72-2) may be adjusted.

Figure 6:
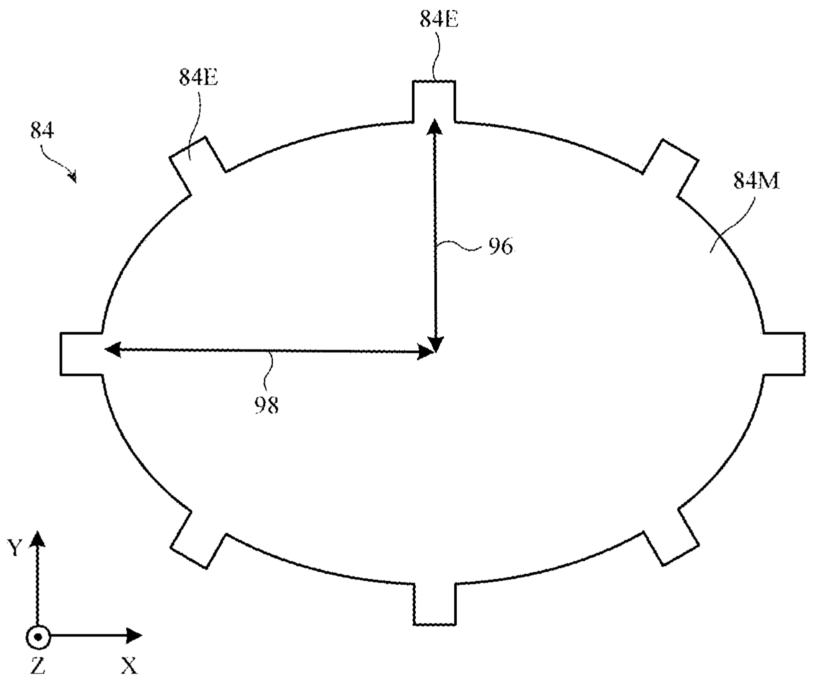
FIG. 6 is a top view of an illustrative lens element having a plurality of tabs around its periphery in accordance with an embodiment.

FIG. 6 is a top view of an illustrative lens element 84 that may be adjusted during operation of lens element 72-2. As shown in the example of FIG. 6, lens element 84 may have a main portion 84M with an elliptical footprint. However, the main portion 84M of lens element 84 may instead have a circular footprint, an irregular footprint, a footprint resembling classic eyeglass lenses, or a footprint of any other desired shape. In the example of FIG. 6, a first distance 96 (e.g., a minimum distance) from the center of the central opening to the edge of the main portion may be smaller than a second distance 98 (e.g., a maximum distance) from the center of the central opening to the edge of the main portion. Distances 96 and 98 may be less than 100 millimeters, less than 60 millimeters, less than 40 millimeters, less than 30 millimeters, greater than 10 millimeters, greater than 20 millimeters, between 10 and 50 millimeters, etc.

Lens element 84 also has a plurality of tabs 84E that extend from the main portion of the lens element. Force (e.g., in direction 94 in FIG. 5) may be applied to tabs 84E (sometimes referred to as extensions 84E, actuator points 84E, protrusions 84E, pins 84E, etc.) to manipulate the shape of lens element 84.

FIG. 6 shows how a plurality of tabs 84E may be distributed around the perimeter of lens element 84. Tabs 84E may be distributed around lens element 84 in a uniform manner (e.g., with equal spacing between each pair of adjacent tabs 84E) or in a non-uniform manner (e.g., with unequal spacing between at least two of the adjacent tabs 84E).

In the example of FIG. 6, there are 8 tabs 84E around the perimeter of lens element 84. This example is merely illustrative. In general, having more tabs allows for greater control of the shape of the lens element. Any desired number of tabs (e.g., one, two, three, four, more than four, more than six, more than eight, more than ten, more than twelve, more than twenty, less than twenty, less than ten, between four and twelve, etc.) may be used depending upon the specific target shapes for the lens element, the target cost/complexity of the lens module, etc.

There are multiple options for how to manipulate the shape of lens element 84. In one possible arrangement, each tab 84E may be coupled to a respective actuator. Each actuator (e.g., a linear actuator) may selectively move its respective tab 84E up and down (e.g., in the Z-direction) to control the position of tab 84E in the Z-direction. However, due to the high number of actuators required, this type of arrangement may have a greater cost, complexity, and size than desired in some applications. To minimize the cost, complexity, and size of device 10, a single actuator may control the position of all tabs 84E. In this way, a single actuator controls the shape of lens element 84.

Regardless of the manipulation scheme used, a point force may be applied to each tab 84E to control the shape of lens element 84. When each tab has a respective actuator, each tab may be controlled independently. When all of the tabs are controlled by one respective actuator, the positions of the tabs are tied together and are controlled in unison (by the single actuator).

Figure 7:
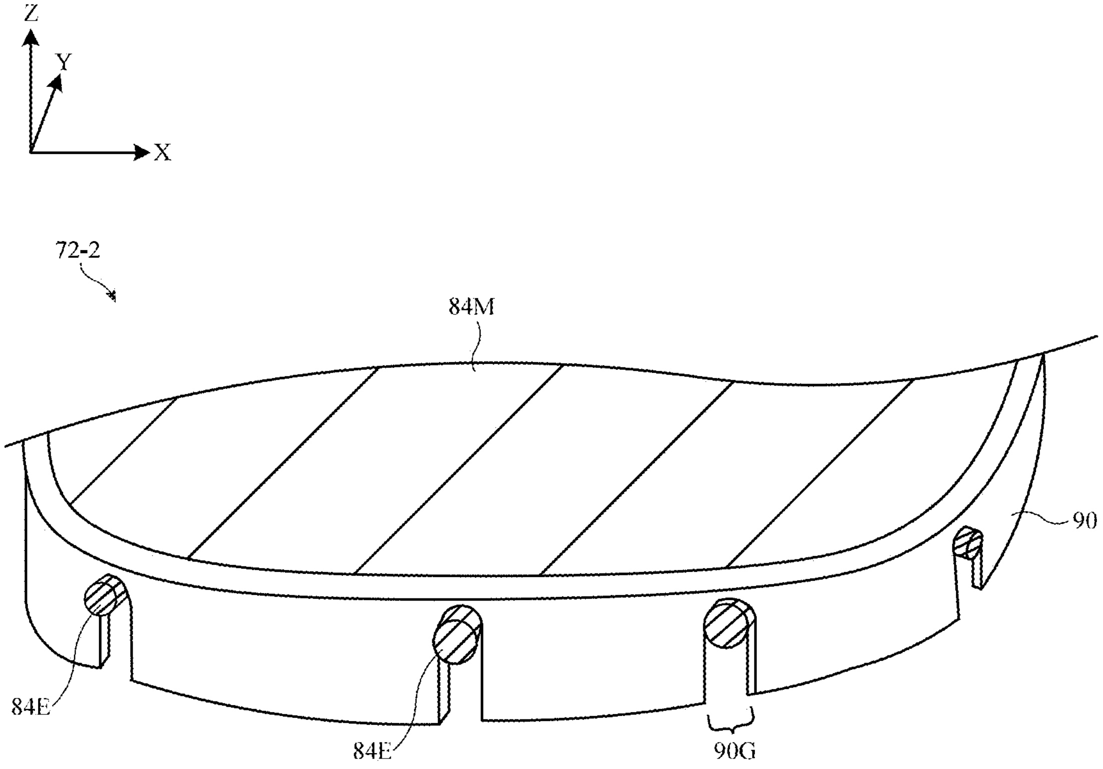
FIG. 7 is a perspective view of an illustrative lens module having a lens housing with grooves that receive tabs in accordance with an embodiment.

The lens module 72-2 may include additional design features to allow a single actuator to control all of tabs 84E. FIG. 7 is a perspective view of a lens element 72-2 with a lens housing 90 that has a plurality of grooves 90G (sometimes referred to as slots 90G). As shown, each groove 90G has an open end on a first side of the lens element and a closed end on a second side of the lens element. Each groove extends along a respective axis that is parallel to the Z-axis. In other words, each groove extends parallel to the Z-axis. Each groove 90G may receive a corresponding tab 84E of lens element 84. Tabs 84E may be biased in the positive Z-direction by fluid-filled chamber 82 of lens element 72-2 (e.g., as depicted in FIG. 4). Therefore, the tabs 84E are biased into and stopped by the closed end of grooves 90G. An actuator may transfer force to tabs 84E to cause tabs 84E to move in the negative Z-direction along grooves 90G. In other words, grooves 90G allow for movement of the tabs along the Z-direction while preventing movement of the tabs in the X or Y directions. During adjustments to lens element 72-2, tabs 84E slide within their respective grooves parallel the Z-axis.

Figure 8:
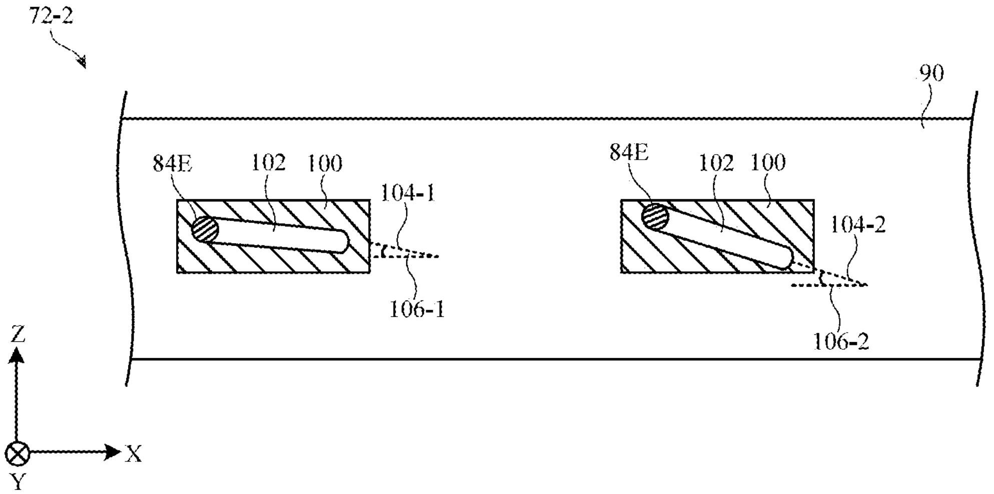
FIGS. 8 and 9 are side views of an illustrative lens module with guide structures having angled slots in accordance with an embodiment.
Figure 9:
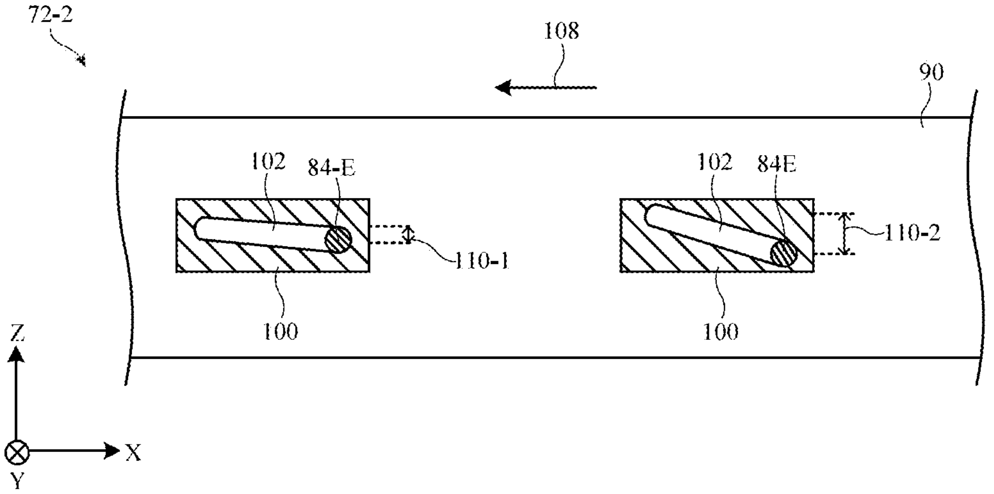
Figure 10:
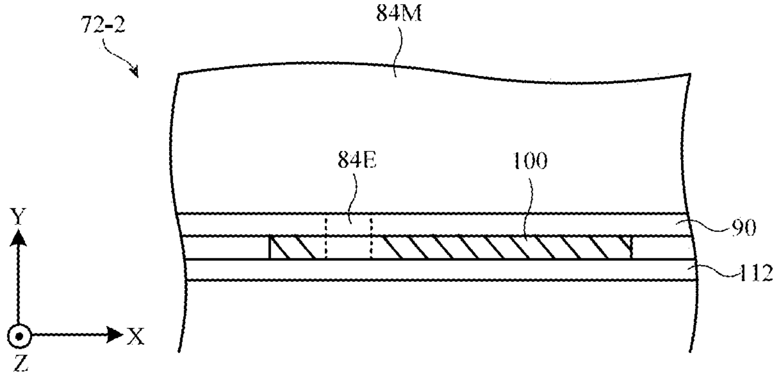
FIG. 10 is a cross-sectional top view of an illustrative lens element with a guide structure positioned between a lens housing and a positioner in accordance with an embodiment.

FIGS. 8-10 show how guide structures may be included in lens element 72-2 to cause a shift in the position of tabs 84E. In addition to extending into a respective groove 90G in housing 90, each tab 84E may extend into a slot 102 of a respective guide structure 100. As shown in FIG. 8, each guide structure 100 overlaps a respective tab 84E. Each guide structure 100 has a respective slot 102 that accommodates a respective tab 84E. Each slot is elongated along an axis 104. Guide structure 100 on the left in FIG. 8 has a slot 102 defined by a respective axis 104-1. Guide structure 100 on the right in FIG. 8 has a slot 102 defined by a respective axis 104-2.

Each axis 104 may be at a respective angle relative to the XY-plane (e.g., the surface on the open end of grooves 90G in FIG. 7). In FIG. 8, axis 104-1 is at an angle 106-1 relative to the XY-plane whereas axis 104-2 is at an angle 106-2 relative to the XY-plane. Angle 106-1 may be different than angle 106-2. For example, in FIG. 8, angle 106-1 is smaller than angle 106-2. Positioning the slot with a greater angle results in more vertical displacement of the respective tab 84E in that slot during adjustments of the lens. Said another way, each slot that accommodates a respective tab may be oriented at a non-zero, non-orthogonal angle relative to the groove that also accommodates that respective tab. The slots may be oriented at different angles relative to their respective grooves to allow for different vertical displacement of different tabs.

In FIGS. 8 and 9, the slots 102 are depicted as having a linear geometry. This example is merely illustrative. In another possible arrangement, one or more curved slots 102 may be used to allow more complicated combinations of relative displacement of the tabs 84E.

As shown in FIG. 9, during operation of lens element 72-2, guide structure 100 may be shifted within the XY-plane. For example, guide structures 100 may be shifted sideways (radially) in direction 108 around the periphery of the lens element. Said another way, guide structures 100 may be rotated relative to lens element 84 and its tabs 84E. Guide structures 100 are not physically attached to tabs 84E and therefore move freely relative to tabs 84E (friction forces notwithstanding). As the guide structures 100 move relative to tabs 84E, the tabs 84E move laterally within slots 102. The angles of slots 102 bias the tabs 84E in the negative Z-direction as the guide structures move from right to left in FIG. 9. In FIG. 8, when the tabs 84E are on the far left side of slots 102, the tabs 84E are at a maximum height in the positive Z-direction. In FIG. 9, when the tabs 84E are on the far right side of slots 102, the tabs 84E are at a minimum height in the positive Z-direction.

The amount of displacement in the Z-direction for each tab 84E is dictated by the angle of its respective slot 102. For example, guide structure 100 on the left in FIG. 9 causes a displacement 110-1 of its tab 84E in the Z-direction. Guide structure 100 on the right in FIG. 9 causes a displacement 110-2 of its tab 84E in the Z-direction. The slot on the right in FIG. 9 has a greater angle than the slot on the left in FIG. 9 and therefore displacement 110-2 is greater than displacement 110-1. Due to the restriction provided by grooves 90G in lens housing 90, tabs 84E are only displaced in the Z-direction.

FIG. 10 is a cross-sectional top view of lens element 72-2 showing how a guide structure 100 may be biased against housing structure 90 to receive a tab 84E. Tab 84E extends through the groove in housing 90 (shown in FIG. 7) and the slot in guide structure 100 (shown in FIGS. 8 and 9). Each guide structure 100 is attached to positioner 112 (sometimes referred to as an actuated positioner 112, ring 112, flexible ring 112, ring-shaped positioner 112, annular positioner 112, flexible band structure 112, etc.). The positioner may have a shape that matches the footprint of lens element 84 (e.g., circular, elliptical, an irregular shape, etc.). The positioner may be referred to as ring-shaped even when the positioner has a non-circular shape. The positioner 112 may be formed from, as an example, a flexible ring of stainless steel that extends around the periphery of the lens element. The positioner may be flexible (resilient) to accommodate non-circular footprints of lens element 84. The positioner 112 is biased by an actuator to create the sideways displacement (e.g., in direction 108 in FIG. 9) of guide structures 100 that is in turn translated to vertical displacement of tabs 84E. Positioner 112 may be a single structure that is attached to each respective guide structure 100. The positioner may be rotated relative to lens element 84 by an actuator.

Figure 11:
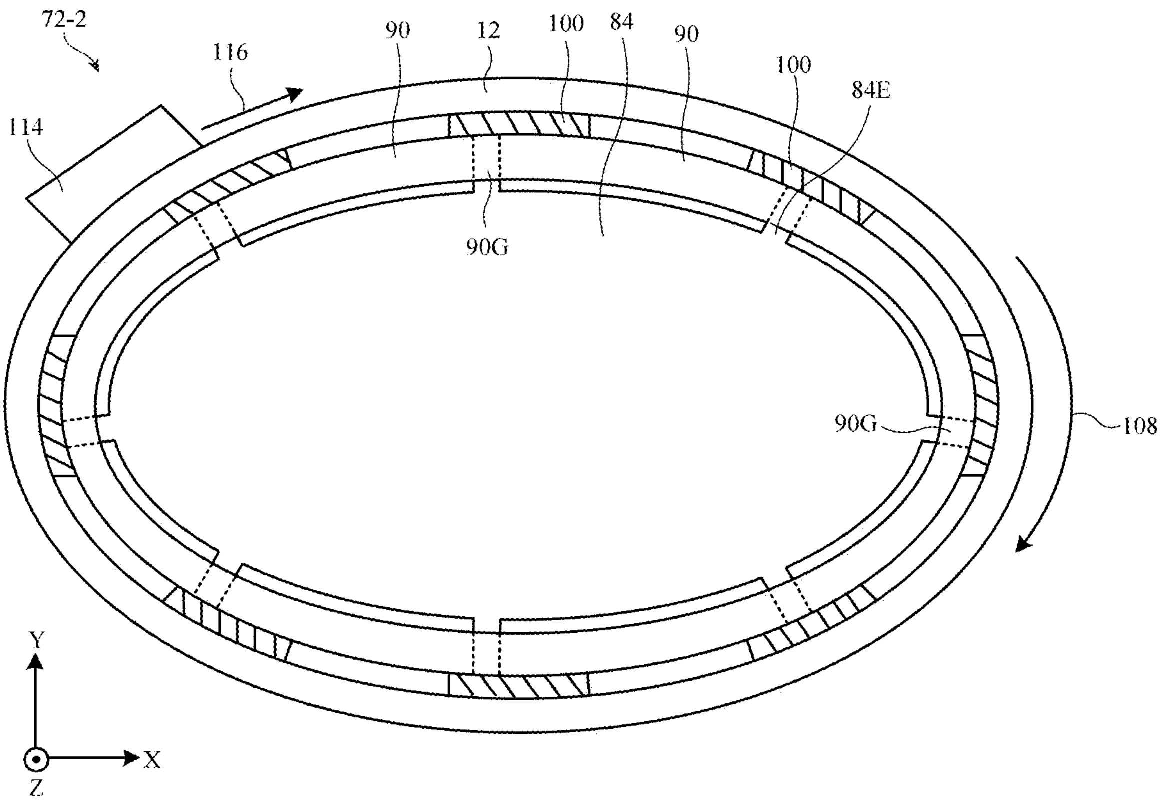
FIG. 11 is a cross-sectional top view of an illustrative lens element with an actuator that controls a ring-shaped positioner in accordance with an embodiment.

FIG. 11 is a cross-sectional top view of lens element 72-2 with an actuator 114. In the example of FIG. 11, lens element 84 has eight tabs 84E. Each tab extends into a respective groove 90G in lens housing 90. Each tab also extends into a slot in a corresponding guide structure 100. Guide structures 100 are distributed around positioner 112 with spacing such that each guide structure has a slot that receives a respective tab 84E. Each tab 84E may be positioned at the same relative position within its slot (e.g., the left side in FIG. 8) to allow the tabs to move relative to their slots in unison. Positioner 112 has a ring shape that extends around the periphery of the lens element 72-2. Positioner 112 is attached to actuator 114. Actuator 114 is a linear actuator that selectively biases positioner 112 in direction 116. This causes positioner 112 and its corresponding guide structures 100 to selectively shift (rotate) in direction 108 around the periphery of the lens element (e.g., clockwise or counter-clockwise around the lens element). This movement within the XY-plane (sometimes described as radial movement, sideways movement, or rotation) causes tabs 84E to shift along the Z-axis.

With an arrangement of the type shown in FIGS. 7-11, a single actuator may control displacement of lens element 84 at multiple points (tabs) around the periphery of the lens element. This minimizes the cost, complexity, and size of the lens module. Additionally, there is high flexibility for how the actuator may be positioned within the device. The actuator simply needs to be able to shift positioner 112 radially around the lens element, meaning that the actuator may be positioned at any point around the circumference of positioner 112. In other words, a convenient location for actuator 114 may be easily selected. Additional structures (e.g., cables, pulleys, etc.) may be included in the device to further decouple the position of the actuator 114 relative to lens element 72-2. In other words, the actuator 114 may be included at a totally separate location within device 10, physically distanced from positioner 112 and the rest of lens element 72-2. However, the additional components may translate the force from actuator 114 to positioner 112, therefore ensuring actuator 114 provides the needed functionality to adjust lens element 72-2.

Another benefit of the arrangement shown in FIGS. 7-11 is that there is freedom to design different displacements at different actuation points around the circumference of the lens element. Consider an example where lens element 72-2 has a circular footprint and the adjustments to lens element 72-2 are intended to adjust the spherical lens power provided by the lens element. In this example, all of the slots 102 in guide structures 100 may be the same, causing the displacement of each tab 84E to be the same around the periphery of lens element 84. The tabs may be displaced by greater amounts to result in the lens element 84E having a greater spherical lens power, for example.

In another example, lens element 72-2 may have a non-circular (e.g., elliptical) footprint. In this case, tabs 84E may need to be shifted by different amounts in the Z-direction to achieve different spherical lens powers. The arrangement of FIGS. 7-11 can still accomplish this by using different slots 102 for different tabs 84E. Tabs 84E that need more displacement will have a corresponding slot with a greater angle and tabs 84E that need less displacement will have a corresponding slot with a lower angle. When actuator 114 shifts positioner 112, all of the guide structures 100 will be shifted by a uniform distance. However, the different slot angles result in that uniform sideways distance being translated into different vertical displacements for the tabs 84E.

Figure 12:
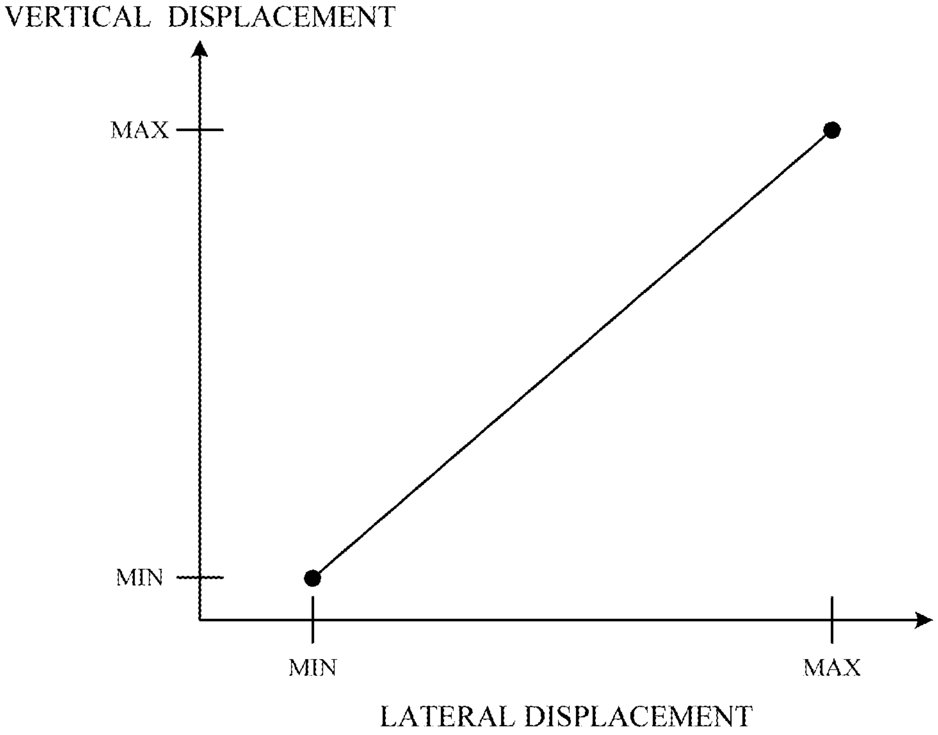
FIG. 12 is a graph of vertical displacement of a lens element tab as a function of lateral displacement of the positioner in accordance with an embodiment.

The arrangement of FIGS. 7-11 results in a linear change in displacement of the tabs 84E. In other words, changes in the lateral position of positioner 112 caused by actuator 114 results in a corresponding linear change in the vertical displacement of tabs 84E (as shown in the graph of FIG. 12). This allows for intermediate positions of positioner 112 to be used with corresponding intermediate positions of tabs 84E. In the graph of FIG. 12, a minimum vertical displacement and a maximum vertical displacement as well as a minimum lateral displacement and a maximum lateral placement are depicted. Because the positioner 112 and guide structures 100 are moved in unison, the minimum and maximum lateral displacements are the same for each guide structure 100. However, each tab 84E may have a unique minimum vertical displacement and maximum vertical displacement as determined by the shape of its corresponding slot 102. Each tab 84E is shifted linearly between its respective minimum and maximum displacements. This results in a smooth performance when adjusting the lens element during operation of device 10.

In other possible arrangements, changes in the lateral position of positioner 112 caused by actuator 114 may result in a corresponding non-linear change in the vertical displacement of tabs 84E. In this type of arrangement, the tabs 84E may be operable in a first position (e.g., a minimum displacement) or a second position (e.g., a maximum displacement). However, intermediate displacements may not be an option.

The aforementioned examples of lens element 72-2 being used to adjust for spherical lens power is merely illustrative. If desired, lens element 72-2 may be designed to have an adjustable cylindrical lens power in addition to or instead of an adjustable spherical lens power. However, once the design of lens element 72-2 is fixed (e.g., the slot shapes are chosen), there is only one degree of freedom during operation of lens element 72-2 (e.g., the actuator shifts all of the tabs 84E in unison). As another possible example, actuator 114 may adjust the lens center while adjusting lens element 72-2. The vertical displacements of tabs 84E may shift the lens center within the XY-plane (for example, to align with verging eyes).

Herein, an example is described where positioner 112 is formed separately from guide structures 100 and attached to those guide structures. In this type of arrangement, guide structures 100 may be attached to positioner 112 in any desired fashion (e.g., using adhesive, screws, nails, protrusions, recesses, etc.).

If desired, the positioner and guide structures may be formed integrally (e.g., a ring with integral slots may be shifted directly by the actuator). In general, the positioner and/or guide structures may be formed from any desired material (e.g., plastic, metal, rubber, etc.). The positioner and/or guide structures may be rigid, semi-rigid, or flexible. However, the slots 102 should be sufficiently strong to bias the tabs 84E as described in connection with FIGS. 8 and 9. As one example, the positioner may be formed by a cable. Pulleys may be positioned around the periphery of the lens element, with the cable attached to the pulleys. A spring may optionally be included to tension the cable. As another example, the positioner may be formed from a watchband type structure with a plurality of links that have rotational flexibility relative to one another but that are not easily stretched or compressed. This type of positioner may be well suited to lens elements with footprints having tight curvature or angled corners.

Any type of actuator 114 may be used in lens element 72-2. In one example, actuator 114 is a linear actuator with a screw and nut. A motor in the actuator may rotate, causing linear motion of the nut along the screw. The nut is in turn attached to positioner 112. The actuator causes selective linear motion of the nut which is translated to rotation of the positioner 112 which is translated to linear (vertical) motion of tabs 84E. This example for an actuator is merely illustrative. If desired, another type of actuator such as a shape-memory alloy (SMA) actuator or a rack and pinion actuator may be used.

In FIGS. 7-11, the tabs 84E revert to a position as far in the positive Z-direction as possible when not biased. The lens element 84 may have a minimum curvature in this state. Actuator 114 applies force to the tabs to push the tabs in the negative Z-direction and increase the curvature of lens element 84. It should be understood that this example is merely illustrative, and an inverse arrangement could be used if desired. A spring may optionally be included in the lens element 72-2 to reduce the force required by actuator 114 to move positioner 112 and shift tabs 84E. In this type of setup, the tabs may revert to an intermediate position without being biased. The tabs may then either be biased in a first direction or a second, opposite direction. However, to avoid backlash when transitioning through the intermediate position, it may be preferable to only bias tabs in one direction as previously mentioned.

If desired, multiple positioners may be included in lens element 72-2, each with a respective actuator. Each positioner may control displacement of one or more corresponding tabs 84E using the aforementioned techniques. The multiple positioners may be stacked in the Z-direction (with each positioner optionally extending around the entire lens element circumference) or positioned within the same plane (e.g., a first positioner extends around the first half of the lens element and controls a first half of tabs 84E and a second positioner extends halfway around the second half of lens element and controls a second half of tabs 84E). This type of arrangement may provide additional degrees of freedom to increase the complexity of the optical functions the tunable lens element can perform.

Figure 13:
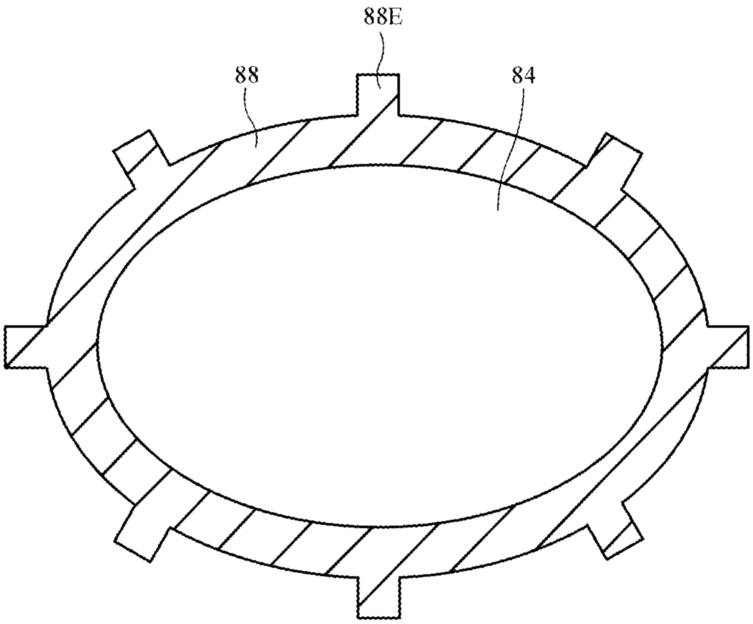
FIG. 13 is a top view of an illustrative lens shaping element that is formed on a lens element in accordance with an embodiment.

In the aforementioned example, lens element 84 has tabs 84E that are manipulated directly by a single actuator. However, this example is merely illustrative. In another possible arrangement, a lens shaping element may be included in the lens module 72-2 in addition to lens element 84. As shown in FIG. 13, the lens shaping element 88 may be a ring-shaped structure with tabs 88E (sometimes referred to as extensions 88E, actuator points 88E, protrusions 88E, pins 88E, etc.) that are manipulated by the actuator. The lens shaping element may have a shape that matches the footprint of lens element 84 (e.g., circular, elliptical, an irregular shape, etc.). The lens shaping element may be referred to as ring-shaped or annular even when the positioner has a non-circular shape. In other words, the lens shaping element has tabs distributed around its periphery similar to as shown in connection with the lens element 84 in FIG. 6. The lens shaping element 88 is attached to the lens element 84 as shown in FIG. 13. Tabs 84E may therefore be omitted from lens element 84. All of the descriptions herein for tabs 84E may also apply to tabs 88E.

The actuator manipulates the position of lens shaping element 88 (at each tab 88E on the lens shaping element), and the lens shaping element in turn manipulates the positioning/shape of lens element 84. In this way, the curvature of the lens element 84 (and accordingly, the lens power of lens module 72) may be adjusted. Lens shaping element 88 may be elastomeric (e.g., a natural or synthetic polymer that has a low Young's modulus for high flexibility, as discussed above in greater detail) or semi-rigid (e.g., formed from a semi-rigid material that is stiff and solid, but not inflexible, as discussed above in greater detail). A semi-rigid lens shaping element may, for example, be formed from a thin layer of polymer, glass, metal, etc. The rigidity of the lens shaping element may be selected such that the lens shaping element assumes desired target shapes when manipulated by the actuators around its perimeter. Because the lens shaping element is formed in a ring around the lens module, the lens shaping element does not need to be transparent (and therefore may be formed from an opaque material such as metal). In embodiments where lens shaping element 88 is included in addition to flexible lens element 84, all of the aforementioned descriptions for functionality of the lens element still apply, only with tabs 88E of the lens shaping element 88 being manipulated within grooves 90G and slots 102 instead of tabs 84E of lens element 84. For simplicity, lens shaping element 88 may sometimes be considered a part of lens element 84.

In accordance with an embodiment, a lens module is provided that includes a transparent lens element having a periphery, a positioner that extends around the periphery of the transparent lens element, and an actuator that selectively shifts the positioner in a first direction, shifting the positioner in the first direction causes the transparent lens element to be biased in a second direction that is orthogonal to the first direction at multiple points around the periphery of the transparent lens elements.

In accordance with another embodiment, the positioner is a ring-shaped positioner and shifting the ring-shaped positioner causes the ring-shaped positioner to rotate relative to the transparent lens element.

In accordance with another embodiment, the positioner is attached to a plurality of guide structures and each guide structure has a slot.

In accordance with another embodiment, the lens module includes a lens shaping element that is attached to the transparent lens element.

In accordance with another embodiment, the lens shaping element is a ring-shaped lens shaping element that extends around the periphery of the transparent lens element.

In accordance with another embodiment, the lens shaping element has a plurality of tabs and each one of the tabs extends into a respective slot on a respective guide structure.

In accordance with another embodiment, the lens module includes a lens housing having a plurality of grooves, the plurality of guide structures is interposed between the lens housing and the positioner and each one of the tabs extends into a respective groove on the lens housing.

In accordance with another embodiment, each groove extends in the second direction.

In accordance with another embodiment, a first slot extends in a third direction at a first non-zero, non-orthogonal angle relative to the second direction.

In accordance with another embodiment, a second slot extends in a fourth direction at a second non-zero, non-orthogonal angle relative to the second direction and the first and second non-zero, non-orthogonal angles are different.

In accordance with another embodiment, the transparent lens element has a plurality of tabs and each one of the tabs extends into a respective slot on a respective guide structure.

In accordance with another embodiment, the lens module includes a lens housing having a plurality of grooves, the plurality of guide structures is interposed between the lens housing and the positioner and each one of the tabs extends into a respective groove on the lens housing.

In accordance with another embodiment, each groove extends in the second direction, a first slot extends in a third direction at a first non-zero, non-orthogonal angle relative to the second direction, a second slot extends in a fourth direction at a second non-zero, non-orthogonal angle relative to the second direction, and the first and second non-zero, non-orthogonal angles are different.

In accordance with another embodiment, the transparent lens element is a first transparent lens element and the lens module includes a second transparent lens element, and a fluid-filled chamber between the first and second transparent lens elements.

In accordance with another embodiment, shifting the positioner in the first direction causes the transparent lens element to be displaced in the second direction by a first distance at a first point of the multiple points and shifting the positioner in the first direction causes the transparent lens element to be displaced in the second direction by a second distance that is different than the first distance at a second point of the multiple points.

In accordance with another embodiment, the positioner is a flexible band structure that extends around the transparent lens element, the transparent lens element has a non-circular footprint, the positioner is attached to guide structures, and the positioner and guide structures move together around the transparent lens element when the positioner is shifted by the actuator.

In accordance with an embodiment, a lens module is provided that includes a transparent lens element having a center, a ring-shaped structure that is coupled to the transparent lens element and that extends around the center of the transparent lens element, the ring-shaped structure has pins that extend away from the center of the transparent lens element, a housing structure that extends around the transparent lens element, the housing structure has grooves, each groove receives a respective pin of the ring-shaped structure, and each groove extends in a first direction, and a ring-shaped positioner that extends around the housing structure, the ring-shape positioner is configured to rotate around the transparent lens element and cause the pins to slide in the first direction within the grooves.

In accordance with another embodiment, the lens module includes guide structures, each guide structure is attached to the ring-shaped positioner and each guide structure has a slot that receives a respective pin.

In accordance with another embodiment, each slot is angled relative to the grooves.

In accordance with an embodiment, a lens module is provided that includes a first transparent lens element, a second transparent lens element, a fluid-filled chamber between the first and second transparent lens elements, a ring-shaped structure, and an actuator configured to shift the ring-shaped structure around a periphery of the first transparent lens element and cause multiple discrete point forces to be applied to the first transparent lens element.

In accordance with another embodiment, the lens module includes guide structures with angled slots that are attached to the ring-shaped structure.

The foregoing is merely illustrative and various modifications can be made to the described embodiments. The foregoing embodiments may be implemented individually or in any combination.

What is claimed is:

1. A lens module, comprising:

a transparent lens element having a periphery;

a positioner that extends around the periphery of the transparent lens element; and an actuator that selectively shifts the positioner in a first direction, wherein shifting the positioner in the first direction causes the transparent lens element to be shifted in a second direction that is orthogonal to the first direction at multiple points around the periphery of the transparent lens elements.

2. The lens module defined in claim 1, wherein the positioner is a ring-shaped positioner and wherein shifting the ring-shaped positioner in the first direction causes the ring-shaped positioner to rotate relative to the transparent lens element.

3. The lens module defined in claim 1, wherein the positioner is attached to a plurality of guide structures and wherein each guide structure has a slot.

4. The lens module defined in claim 3, wherein the lens module further comprises a lens shaping element that is attached to the transparent lens element.

5. The lens module defined in claim 4, wherein the lens shaping element is a ring-shaped lens shaping element that extends around the periphery of the transparent lens element.

6. The lens module defined in claim 5, wherein the lens shaping element has a plurality of tabs and wherein each one of the tabs extends into a respective slot on a respective guide structure.

7. The lens module defined in claim 6, wherein the lens module further comprises:

a lens housing having a plurality of grooves, wherein the plurality of guide structures is interposed between the lens housing and the positioner and wherein each one of the tabs extends into a respective groove on the lens housing.

8. The lens module defined in claim 7, wherein each groove extends in the second direction.

9. The lens module defined in claim 8, wherein a first slot extends in a third direction at a first non-zero, non-orthogonal angle relative to the second direction.

10. The lens module defined in claim 9, wherein a second slot extends in a fourth direction at a second non-zero, non-orthogonal angle relative to the second direction and wherein the first and second non-zero, non-orthogonal angles are different.

11. The lens module defined in claim 3, wherein the transparent lens element has a plurality of tabs and wherein each one of the tabs extends into a respective slot on a respective guide structure.

12. The lens module defined in claim 11, wherein the lens module further comprises:

a lens housing having a plurality of grooves, wherein the plurality of guide structures is interposed between the lens housing and the positioner and wherein each one of the tabs extends into a respective groove on the lens housing.

13. The lens module defined in claim 12, wherein each groove extends in the second direction, wherein a first slot extends in a third direction at a first non-zero, non-orthogonal angle relative to the second direction, wherein a second slot extends in a fourth direction at a second non-zero, non-orthogonal angle relative to the second direction, and wherein the first and second non-zero, non-orthogonal angles are different.

14. The lens module defined in claim 1, wherein the transparent lens element is a first transparent lens element and wherein the lens module further comprises:

a second transparent lens element; and a fluid-filled chamber between the first and second transparent lens elements.

15. The lens module defined in claim 1, wherein shifting the positioner in the first direction causes the transparent lens element to be shifted in the second direction by a first distance at a first point of the multiple points and wherein shifting the positioner in the first direction causes the transparent lens element to be shifted in the second direction by a second distance that is different than the first distance at a second point of the multiple points.

16. The lens module defined in claim 1, wherein the positioner is a flexible band structure that extends around the transparent lens element, wherein the transparent lens element has a non-circular footprint, wherein the positioner is attached to guide structures, and wherein the positioner and guide structures move together around the transparent lens element when the positioner is shifted by the actuator.

17. A lens module comprising:

a transparent lens element having a center;

a ring-shaped structure that is coupled to the transparent lens element and that extends around the center of the transparent lens element, wherein the ring-shaped structure has pins that extend away from the center of the transparent lens element;

a housing structure that extends around the transparent lens element, wherein the housing structure has grooves, wherein each groove receives a respective pin of the ring-shaped structure, and wherein each groove extends in a first direction; and a ring-shaped positioner that extends around the housing structure, wherein the ring-shaped positioner is configured to rotate around the transparent lens element and cause the pins to slide in the first direction within the grooves.

18. The lens module defined in claim 17, further comprising:

guide structures, wherein each guide structure is attached to the ring-shaped positioner and wherein each guide structure has a slot that receives a respective pin.

19. The lens module defined in claim 18, wherein each slot is angled relative to the grooves.

20. A lens module comprising:

a first transparent lens element;

a second transparent lens element;

a fluid-filled chamber between the first and second transparent lens elements;

a ring-shaped structure; and an actuator configured to shift the ring-shaped structure around a periphery of the first transparent lens element and cause multiple discrete point forces to be applied to the first transparent lens element.

21. The lens module defined in claim 20, wherein the lens module further comprises:

guide structures with angled slots that are attached to the ring-shaped structure.

* * * * *